United States Patent
Sakata et al.

(10) Patent No.: US 6,944,375 B2
(45) Date of Patent: Sep. 13, 2005

(54) OPTICAL ELEMENT AND ILLUMINATOR AND PROJECTION DISPLAY DEVICE

(75) Inventors: Hidefumi Sakata, Tatsuno-cho (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 10/681,214

(22) Filed: Oct. 9, 2003

(65) Prior Publication Data

US 2004/0120647 A1 Jun. 24, 2004

(30) Foreign Application Priority Data

Nov. 28, 2002 (JP) ........................................ 2002-344775

(51) Int. Cl.[7] ................................................ G02B 6/26
(52) U.S. Cl. ............................. 385/39; 385/34; 385/36
(58) Field of Search ............................. 385/33, 34, 36, 385/39, 43, 48

(56) References Cited

U.S. PATENT DOCUMENTS

2005/0018308 A1 * 1/2005 Cassarly et al. ............ 359/630

FOREIGN PATENT DOCUMENTS

| JP | A 2000-56410 | 2/2000 |
|----|--------------|--------|
| JP | 2000-194275 | 7/2000 |
| JP | A 2002-189263 | 7/2002 |

* cited by examiner

*Primary Examiner*—Phan T. H. Palmer
(74) *Attorney, Agent, or Firm*—Oliff & Berridge, PLC

(57) ABSTRACT

The invention relates to a technique of providing illumination light having an even intensity, in order to make intensity of three illumination light with a simple structure. A second optical waveguide having a second incidence plane for second color light and a third optical waveguide having a third incidence plane for third color light are joined to a first optical waveguide having a first incidence plane for first optical light and an emergence plane opposed to the first incidence plane. A first dichroic filter that reflects the first color light and the third color light and transmits the second color light is formed on a joint surface between the first optical waveguide and the second waveguide. A second dichroic filter that reflects the first color light and the second color light and transmits the third color light is formed on a joint surface between the first optical waveguide and the third waveguide.

6 Claims, 4 Drawing Sheets

OPTICAL ELEMENT AND ILLUMINATOR AND PROJECTION DISPLAY DEVICE

BACKGROUND OF THE INVENTION

1. Field of Invention

The present invention relates to an optical element, an illuminator and a projection display device having the optical element.

2. Description of Related Art

It is advantageous to provide display devices that are large and that have high resolution. Projection display devices, such as liquid crystal projectors and digital mirror devices (DMDs), can easily achieve a large-screen display.

Among them, single-panel projection display devices, as disclosed in JP-A-2000-56410, can be advantageous because of their high throughput and simple structure, in which LED light sources of R (red), G (green), and B (blue), arranged around a dichroic prism, are lit on by time division and color light emitted from each light source is modulated with a light valve to be composed on a screen.

SUMMARY OF THE INVENTION

Using the LED as a light source sometimes poses the problem of decreasing illumination uniformity owing to the large radiation-angle distribution of the LED. Therefore, it is necessary to provide a method of making illumination light even, such as a rod lens, between each light source and the dichroic prism to thereby make the light intensity even on the light valve. However, with the above structure having separate light sources around the dichroic prism, the rod lens must be arranged for each light source, thus increasing the size of the illuminator.

The present invention addresses the above and/or other problems, and provides an optical element, an illuminator and a projection display device having the optical element, in which the intensity of three illumination light is even with a simple structure.

In order to address or achieve the above, an optical element according to an exemplary embodiment of the present invention includes a first optical waveguide having a first incidence plane on which first color light is incident and an emergence plane opposed to the first incidence plane; a second optical waveguide having a second incidence plane on which second color light is incident; a third optical waveguide having a third incidence plane on which third color light is incident, the second optical waveguide and the third optical waveguide being joined to the first optical waveguide; a first dichroic filter formed on a joint plane between the first optical waveguide and the second optical waveguide to reflect the first color light and the third color light and transmitting the second color light; and a second dichroic filter formed on a joint plane between the first optical waveguide and the third optical waveguide to reflect the first color light and the second color light and transmitting the third color light, the three color light being emerged from the emergence plane of the first optical waveguide.

With the above structure, for example, the first color light incident on the first incidence plane propagates in the first optical waveguide directly or while being reflected by the first dichroic filter and the second dichroic filter and is emerged from the emergence plane. The second color light incident on the second incidence plane propagates in the first optical waveguide or the second optical waveguide while being reflected by the second dichroic filter and is finally emerged from the emergence plane of the first optical waveguide. The third color light incident on the third incidence plane propagates in the first optical waveguide or the third optical waveguide while being reflected by the first dichroic filter and is finally emerged from the emergence plane of the first optical waveguide. The optical components incident at various incidence angle are superposed on the emergence plane. Thus, the light intensity is made even as a whole.

Such an arrangement makes the intensity of the color light in the emergence plane even by a single optical element, thus reducing the number of necessary components to provide a compact optical system.

The first incidence plane, the second incidence plane, and the third incidence plane are preferably arranged substantially on the same plane.

Such an arrangement allows the three optical sources corresponding to the respective color light to be arranged substantially on the same plane. This allows commonality of accessories, such as a cooling fan, which have been provided for each light source, thereby reducing the size of the entire structure of the optical system.

The first optical waveguide is preferably a tapered optical waveguide in which the area of the emergence plane is larger than that of the first incidence plane. With such an arrangement, the color light are reflected by the first dichroic filter or the second dichroic filter, so that the directions are corrected to the direction parallel to the system's optical axis. This reduces the light-incidence-angle distribution so as to provide emission light with a high degree of parallelization with respect to the system's optical axis. Accordingly, when this optical element is applied to a projection display device, all the three light can be substantially perpendicularly incident on the incidence plane of the light modulator, thus providing high throughput and light display. The system's optical axis is the emission optical axis of the entire illuminator including the optical element.

An illuminator according to an exemplary embodiment of the invention includes a first light source to emit first color light; a second light source to emit second color light; a third light source to emit third color light; and the optical element having the three incidence planes on which the respective color light incident.

The arrangement provides illumination light having an even light intensity on the emergence plane, with a compact structure.

In this case, the first color light is preferably green light.

Since the first incidence plane is opposed to the emergence plane, the first color light incident on the first incidence plane has less deviated angular distribution of emission light intensity, thus having higher light-use efficiency than those of the second color light and the third color light. Consequently, the use of the green light with high photopic luminous efficiency as the first color light, as in this arrangement, provides high-quality display when the illuminator is applied to the projection display device.

A projection display device according an exemplary embodiment of the invention includes the above-described illuminator and a light modulator to modulate the color light emerged from the optical element.

The arrangement provides a compact projection display device capable of high-quality display with less unevenness in brightness.

DETAILED DESCRIPTION OF PREFERRED EMBODIMENTS

Figure 1:
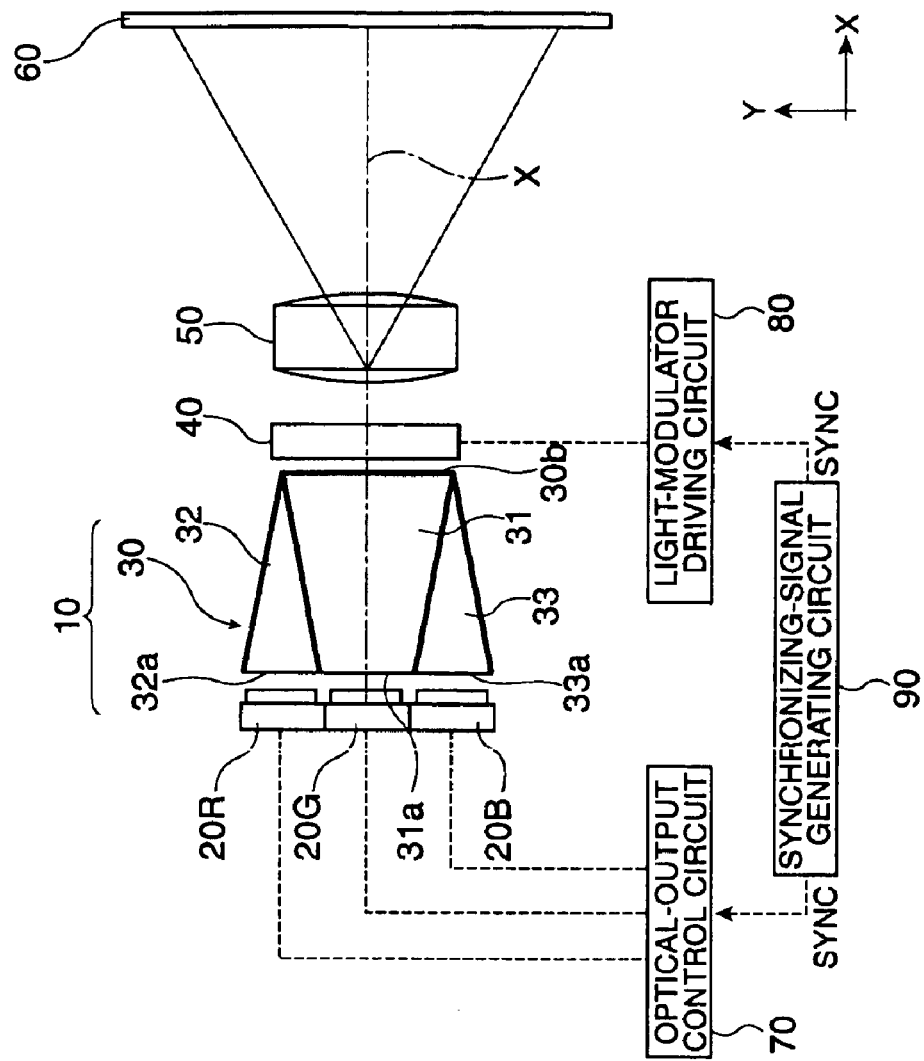
FIG. 1 is a schematic of a projection display device according to an exemplary embodiment of the present invention.
Figure 2:
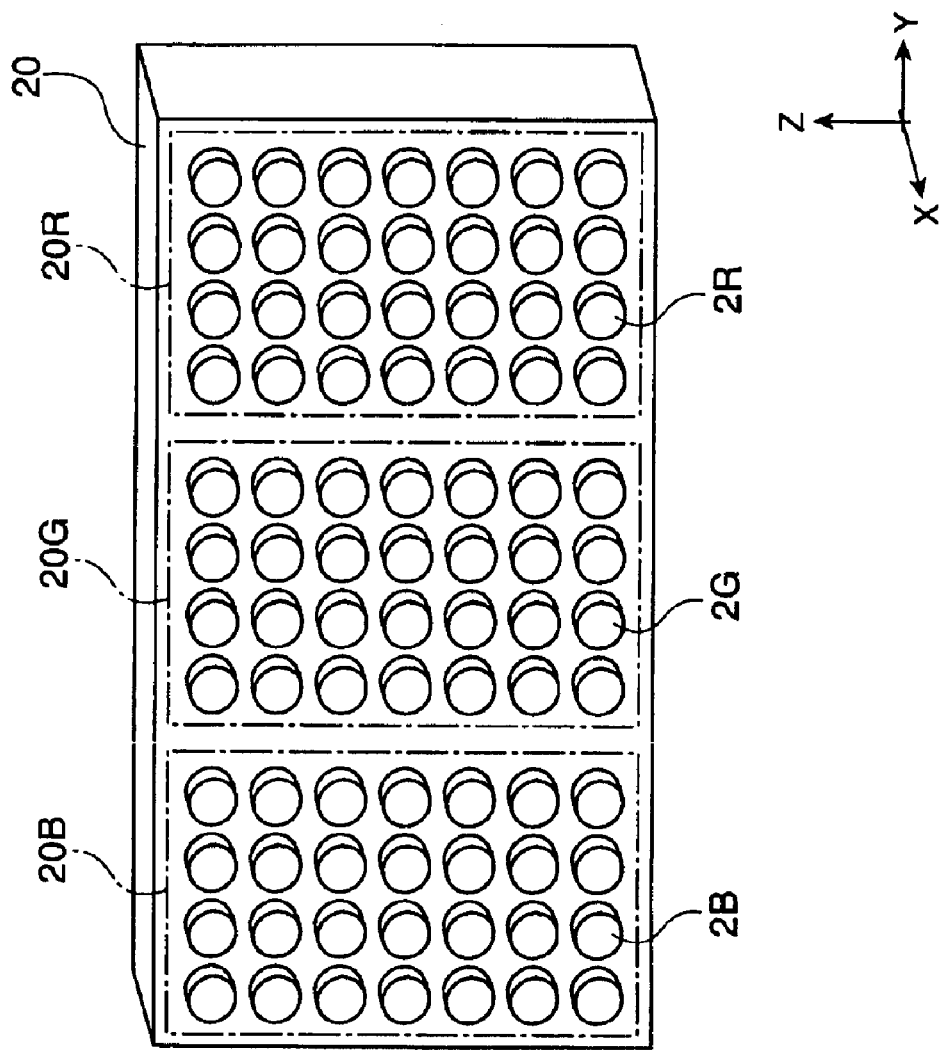
FIG. 2 is a schematic that shows an example of the arrangement of light sources provided to the projection display device according to the exemplary embodiment of the present invention.
Figure 3:
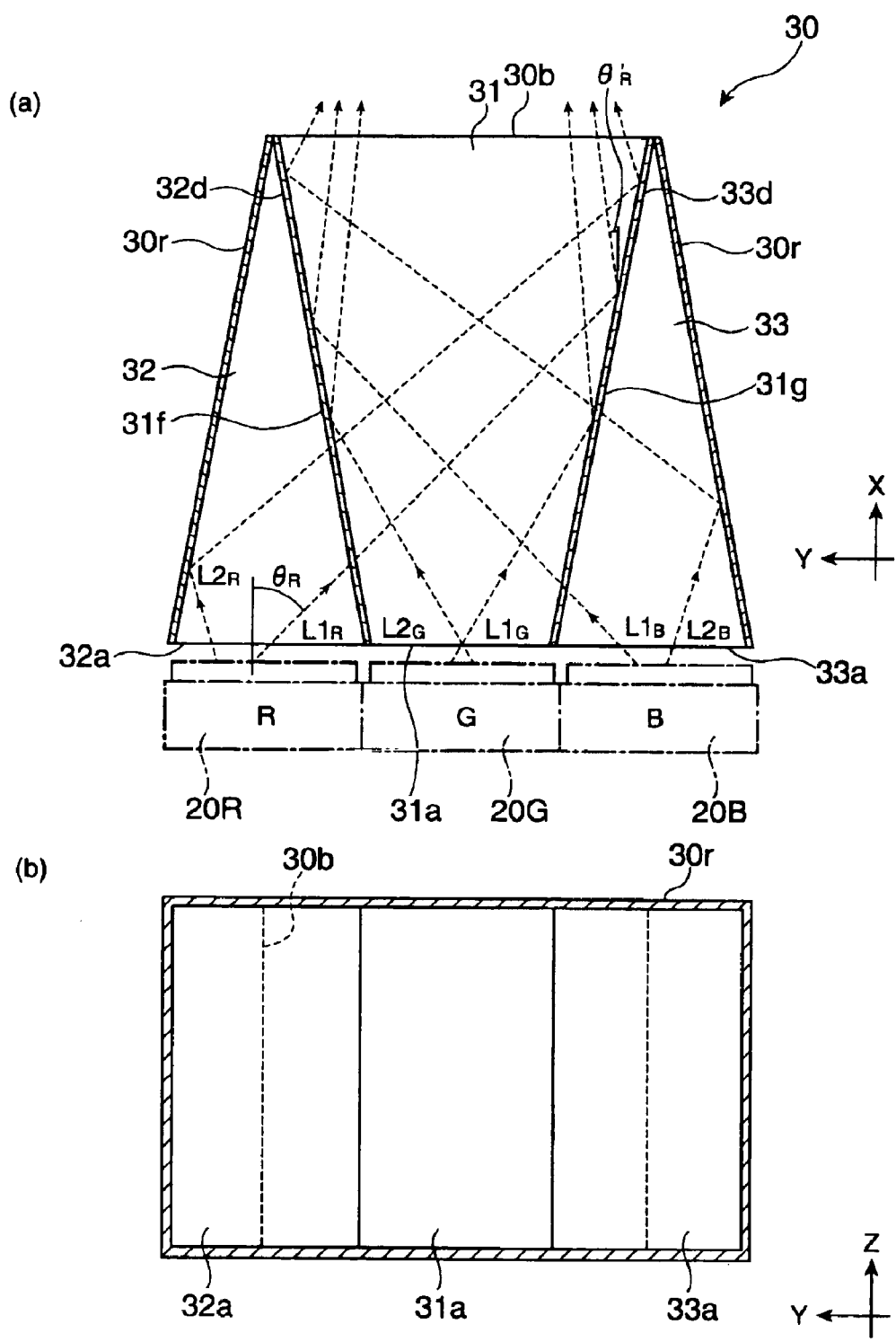
FIGS. 3(a) and 3(b) are schematics of a prism complex provided to the projection display device according to the exemplary embodiment of the present invention.
Figure 4:
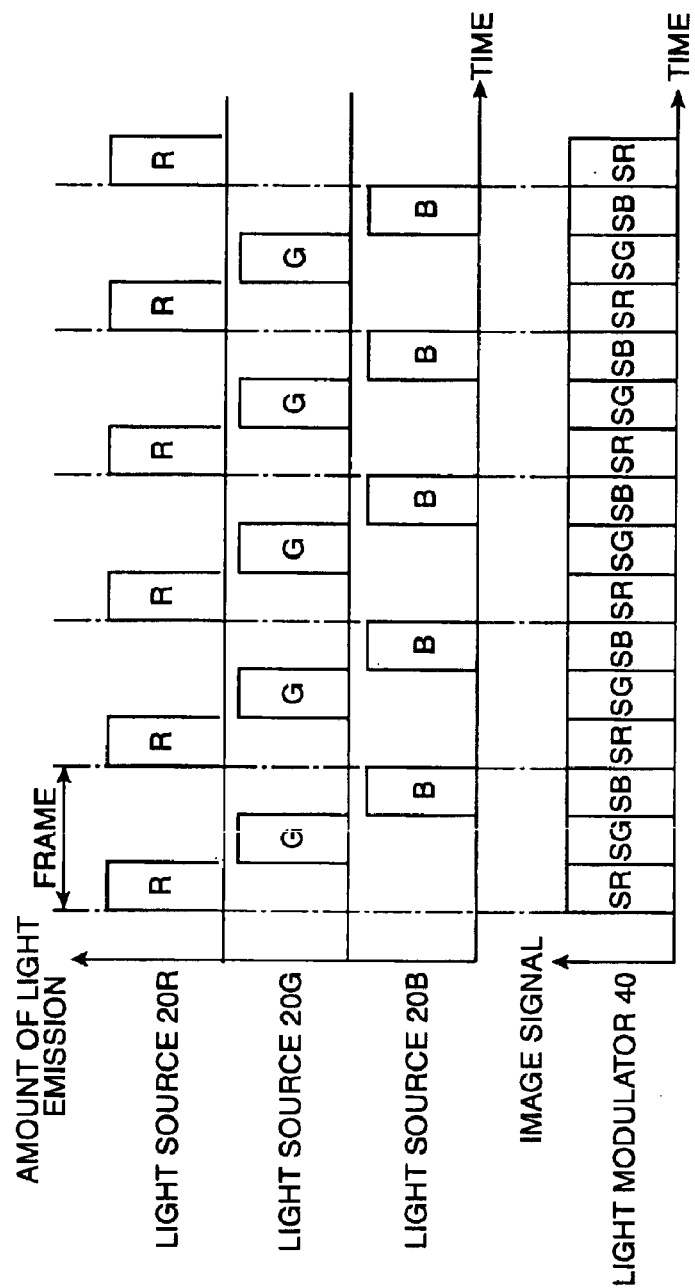
FIG. 4 is a schematic explaining the operation of the projection display device according to the exemplary embodiment of the present invention.

Referring to FIGS. 1 to 3(b), a projection display device according to an exemplary embodiment of the present invention described below. FIG. 1 is a schematic of a projection display device according to the exemplary embodiment; FIG. 2 is a schematic perspective view of an example of the arrangement of light sources provided to the projection display device; FIGS. 3(a) and 3(b) are schematics of a prism complex provided to the projection display device, where FIG. 3(a) is a schematic as viewed along the Z axis and FIG. 3(b) is a schematic as viewed along the X axis; and FIG. 4 is a schematic for explaining the operation method of the projection display device.

The system's optical axis of the projection display device is set to X axis. In the following diagrams, ratio of the thickness and the dimensions of the components are merely shown as appropriate for better viewability and do not necessarily represent their relative sizes.

Referring to FIG. 1, the projection display device according to the exemplary embodiment includes an illuminator 10 having light sources 20R, 20G, and 20B capable of emitting color light with different three wavelengths and a prism complex (optical element) 30 having three incidence planes corresponding to respective color light, alight modulator 40 to modulate the color light emitted from the illuminator 10 to output a color image, and a projection optical system 50 to project the image outputted from the light modulator 40, with an enlarged scale, on a screen 60.

Referring to FIG. 2, the light sources 20R, 20G, and 20B have a structure in which a plurality of light-emitting elements 2R, 2G, and 2B, such as light-emitting diodes (LEDs), which can emit red light (second color light), green light (first color light), and blue light (third color light), respectively, is arranged in an array on a printed board 20. The light sources 20R, 20G, and 20B are placed in a line on substantially the same surface and are cooled down by a common cooling fan (not shown) provided on the back of the printed board 20. While FIG. 2 shows one light source formed of 4×7 chip of LEDs, each of the light sources 20R, 20G, and 20B may be formed of one light-emitting element.

The color-light emission timing of the light sources 20R, 20G, and 20B is controlled by an optical-output control circuit 70; one frame is time-divided and red light, green light, and blue light are emitted from the light sources 20R, 20G, and 20B in time sequence.

Referring to FIG. 3, the prism complex 30 is a rod-lens complex formed by joining a first rod lens (optical waveguide) 31 substantially shaped like a square pole, and second and third rod lens (optical waveguides) 32, 33, each substantially shaped like a triangle pole, each another and is substantially shaped like a trapezoidal pole as a whole.

The first rod lens 31 is substantially shaped like a trapezoidal pole in plan view (viewed along the Z axis), where among two parallel sides of the trapezoid, the side corresponding to the short side is opposed to the light source 20G to form an incidence plane 31a for green light (first incidence plane), and among the two sides, the side corresponding to the long side forms an light emergence plane 30b. The incidence plane 31a and the emergence plane 30b are arranged on the system's optical axis (X axis) to allow the green light incident on the incidence plane 31a out from the emergence plane 30b efficiently. The sides adjacent to the incidence plane 31a form joint surfaces 31f and 31g with a second rod lens 32 and a third rod lens 33, respectively.

The second rod lens 32 is substantially shaped like a triangle in plan view, the side corresponding to one side (bottom) of the triangle being opposed to the light source 20R to form an incidence plane (second incidence plane) 32a for red light. The side of the second rod lens 32, adjacent to the incidence plane 32a, is joined to the first joint surface 31f of the first rod lens 31, and the incidence plane 32a and the first incidence plane 31a are arranged substantially on the same plane in connection.

The third rod lens 33 is substantially shaped like a triangle in plan view, the side corresponding to one side (bottom) of the triangle being opposed to the light source 20B to form an incidence plane (third incidence plane) 33a for blue light. The side of the third rod lens 33, adjacent to the incident plane 33a, is joined to a first joint surface 33d of the first rod lens 31, and the incidence plane 33a and the first incidence plane 31a are arranged substantially on the same plane in connection.

The joint surface (first joint surface) 31f between the first rod lens 31 and the second rod lens 32 has a first dichroic filter 32d that reflects green light and blue light and transmits red light. The joint surface 31g between the first rod lens 31 and the third rod lens 33 has a second dichroic filter 33d that reflects green light and red light and transmits blue light.

The prism complex 30 has a reflecting film 30r on the outer periphery, except on the incidence planes 31a to 33a and the emergence plane 30b, to prevent the light from the light source from leaking from the side plane other than the emergence plane 30b to the exterior.

The light modulator 40 is formed as an active-matrix transmissive liquid-crystal device for outputting an image corresponding to each color light in accordance with the timing at which each color light is emitted from the light source 20 by a light-modulator driving circuit 80. At that time, in order to synchronize the color-light emission timing and the timing of driving the light modulator 40, a synchronizing signal SYNC is outputted from a synchronizing-signal generating circuit 90 to the optical-output control circuit 70 and the light-modulator driving circuit 80. Also, in order to increase light-use efficiency, a polarizing beam splitter (PBS) array to adjust the polarizing direction of light may be arranged between the light modulator 40 and the prism complex 30.

Referring to FIGS. 3(a)–4, the operation of the projection display device according to the exemplary embodiment is described below.

As shown in FIG. 4, in the projection display device, one frame is divided into three, and the synchronizing signal SYNC is outputted to the optical-output control circuit 70 and the light-modulator driving circuit 80 at the divided timing.

Red light, green light, and blue light are sequentially emitted from the light sources 20R, 20G, and 20B in accordance with the synchronizing signal SYNC, and are incident on the incidence planes 31a to 33a of the prism complex 30, respectively. Each color light propagates in the prism complex 30 to decrease in the angular distribution of the light intensity and then emerges from the emergence plane 30b.

At that time, as shown in FIG. 3(a), red light L1R incident on the first rod lens 31 from the light source 20R at a large incidence angle (in the direction inclined by θR with respect to the X axis) passes through the first dichroic filter 32d and is then reflected by the second dichroic filter 33d. At that time, the second dichroic filter 33d is inclined with respect to the X axis, so that the direction of the red light L1R is corrected by the reflection to the direction parallel to the X axis. Then it emerges from the emergence plane 30b in the direction that forms an angle θ'R (<θR) with respect to the X axis. Red light L2R incident on the reflecting film 30r is reflected by the reflecting film 30r, then passes through the first dichroic filter 32d, and is reflected by the second dichroic filter 33d. The light is emitted from the emergence plane 30b similarly, with the directions corrected to the direction parallel to the X axis.

Blue light L1B emitted from the light source 20B toward the first rod lens 31 passes through the second dichroic filter 33d and is then reflected by the first dichroic filter 32d. Blue light L2B emitted toward the reflecting film 30r is reflected by the reflecting film 30r, passes through the second dichroic filter 33d, and is then reflected by the first dichroic filter 32d. The blue light L1B and L2B are emitted from the emergence plane 30b, with the directions corrected to the direction parallel to the X axis.

Green light L1G and L2G emitted from the light source 20G toward the second rod lens 32 and the third rod lens 33 are reflected by the second dichroic filter 33d, the first dichroic filter 32d, respectively, where the directions are corrected to the direction parallel to the X axis, and are emitted from the emergence plane 30b.

FIG. 3(a) shows an example in which the number of reflections is one for simple explanation. In practice, however, color light is incident at various incidence angles, thus including cases in which several times of reflections are made. In this case, the larger the incidence angle is, the more reflections are made and the more reflections are made, the more the direction of light is corrected relative to the direction of the system's optical axis. Therefore, even when the light source 20R has a large incidence-angle distribution, the light emerged from the emergence plane 30b becomes highly parallel to the system's optical axis.

Referring to FIG. 4, the light modulator 40 outputs image signals SR, SG, and SB corresponding to the respective color light emitted from the light sources 20R, 20G, and 20B for each frame in accordance with the emission timing of the respective color light.

The outputted image signals SR, SG, and SB are projected in enlarged composite color image on the screen 60 by a projection optical system 50.

Thus, with the projection display device of the invention, the intensity of light is made even in the emergence plane 30b through the rod lenses 31 to 33, thus providing high-quality display with little unevenness in brightness. With the projection display device, since the intensity of color light in the emergence plane 30b is made even by the one optical element 30, the number of components can be decreased as compared with related art illuminators that require a device to make illumination light even for each light source, thus providing a compact optical system.

Since the incidence planes 31a to 33a of the optical element are arranged substantially on the same plane, all the light sources 20R, 20G, and 20B can be arranged on one printed board 20. This allows the cooling fan, which has been provided for each light source, to be shared, so that the three light sources 20R, 20G, and 20B can be cooled by one fan at the same time. Commonality of the accessories, which have been provided for each light source, reduces the size of the entire structure of the illuminator 10.

Also, since the first rod lens 31 is constructed as a tapered rod lens of which the area of the emergence plane 30b is larger than that of the incidence plane 31a, all the color light can be let in the incidence plane of the light modulator 40 almost perpendicularly.

More specifically, with the optical element, since a dichroic filter (such as the dichroic filter 33d) that reflects predetermined color light (for example, red light) is inclined at an obtuse angle with respect to the incidence plane for the color light, the direction of the color light that has entered in an angle to the incidence plane is changed to the direction parallel to the system's optical axis (X axis) when reflected by the dichroic filter. Assuming that the dichroic filter is arranged in parallel or at an acute angle to the system's optical axis, red light and blue light emitted from the position out of the system's optical axis have many ratios that are emitted in the direction crossing the system's optical axis. Great deviation of the emergence-angle distribution may pose the problem of providing dark display and low contrast. On the other hand, with the present structure in which the deviation of the emergence-angle distribution is improved not only for the light source 20G arranged on the system's optical axis (X axis) but also for the light sources 20R and 20B arranged in the positions out of the system's optical axis, all the color light can be allowed in the light modulator 40 substantially perpendicularly, thus allowing light display with high light-use efficiency.

Particularly, since the incidence plane 31a arranged on the system's optical axis is opposed to the emergence plane 30b, color light incident on the incidence plane 31a has less deviated angular distribution of emission light intensity, thus having higher light-use efficiency than that of color light incident on the other incidence planes 32a and 33a. Consequently, arranging the green light source 20G with high visual sensitivity in the center portion, as in the projection display device, provides high-quality display.

The present invention is not limited to the above-described exemplary embodiments, and various modifications may be made without departing from the spirit and scope of the invention.

For example, while the exemplary embodiment uses a transmissible liquid crystal device as a light modulator, alternatively, a reflection liquid-crystal light valve or a digital mirror device (DMD) may be used.

What is claimed is:

1. An optical element, comprising:
   a first optical waveguide having a first incidence plane on which first color light is incident and an emergence plane opposed to the first incidence plane;
   a second optical waveguide having a second incidence plane on which second color light is incident;
   a third optical waveguide having a third incidence plane on which third color light is incident, the second optical waveguide and the third optical waveguide being joined to the first optical waveguide;
   a first dichroic filter formed on a joint plane between the first optical waveguide and the second optical waveguide to reflect the first color light and the third color light and transmitting the second color light; and a second dichroic filter formed on a joint plane between the first optical waveguide and the third optical waveguide to reflect the first color light and the second color light and transmitting the third color light;

the three color light being emerged from the emergence plane of the first optical waveguide.

2. The optical element according to claim 1, the three incidence planes being arranged substantially on the same plane.

3. The optical element according to claim 1, the first optical waveguide being a tapered optical waveguide in which the area of the emergence plane is larger than that of the first incidence plane.

4. An illuminator, comprising:

a first light source to emit first color light;

a second light source to emit second color light;

a third light source to emit third color light; and the optical element according to claim 1 having the three incidence planes on which the respective color light is incident.

5. The illuminator according to claim 4, the first color light being green light.

6. A projection display device, comprising:

the illuminator according to claim 4; and a light modulator to modulate the color light emerged from the optical element.

* * * * *